United States Patent
Wang

(10) Patent No.: US 10,819,538 B2
(45) Date of Patent: Oct. 27, 2020

(54) METHOD AND APPARATUS FOR ESTABLISHING LINK BETWEEN VIRTUALIZED NETWORK FUNCTIONS

(71) Applicant: Huawei Technologies Co., Ltd., Shenzhen (CN)

(72) Inventor: Hua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 15/708,823

(22) Filed: Sep. 19, 2017

(65) Prior Publication Data
US 2018/0013586 A1    Jan. 11, 2018

Related U.S. Application Data

(63) Continuation of application No. PCT/CN2015/099943, filed on Dec. 30, 2015.

(30) Foreign Application Priority Data

Mar. 31, 2015    (CN) .......................... 2015 1 0147457

(51) Int. Cl.
*H04L 12/46*    (2006.01)
*G06F 9/50*    (2006.01)
(Continued)

(52) U.S. Cl.
CPC ........ *H04L 12/4641* (2013.01); *G06F 9/5077* (2013.01); *H04L 12/46* (2013.01);
(Continued)

(58) Field of Classification Search
CPC . H04L 12/4641; H04L 61/2007; H04L 12/46; H04L 41/0886; H04L 41/5054; H04L 41/12; G06F 9/5077
See application file for complete search history.

(56) References Cited

U.S. PATENT DOCUMENTS

| 9,384,028 B1 * | 7/2016 | Felstaine ................. H04L 67/02 |
| 2014/0229945 A1 | 8/2014 | Barkai et al. |

(Continued)

FOREIGN PATENT DOCUMENTS

| CN | 101605316 A | 12/2009 |
| CN | 101827455 A | 9/2010 |

(Continued)

OTHER PUBLICATIONS

Network Functions Virtualisation (NFV); Management and Orchestration, ETSI Group Specification, ETSI GS NFV-MAN 001 V1.1.1 (Dec. 2014), 184 pages.

(Continued)

*Primary Examiner* — Chris Parry
*Assistant Examiner* — Steven C Nguyen
(74) *Attorney, Agent, or Firm* — Slater Matsil, LLP

(57) ABSTRACT

The present invention discloses a method and an apparatus for establishing a link between virtualized network functions. The method includes obtaining an internet protocol (IP) address of a connection point (CP) of a first virtualized network function (VNF) and identification information of the CP. The method also includes determining identification information of a second VNF corresponding to the identification information of the CP of the first VNF, sending the IP address of the CP of the first VNF and the identification information of the CP to the second VNF corresponding to the identification information of the second VNF. Additionally, the method includes starting a link connection establishment process between a CP of the second VNF and the CP of the first VNF.

16 Claims, 7 Drawing Sheets

(51) Int. Cl.
H04L 12/24 (2006.01)
H04L 29/12 (2006.01)

(52) U.S. Cl.
CPC .......... *H04L 41/0886* (2013.01); *H04L 41/12* (2013.01); *H04L 41/5054* (2013.01); *H04L 61/2007* (2013.01)

(56) References Cited

U.S. PATENT DOCUMENTS

2014/0317261 A1* 10/2014 Shatzkamer ............ G06F 9/455 709/223
2015/0172126 A1   6/2015 Xiao et al.
2016/0366014 A1* 12/2016 Koo .................... H04L 12/4641
2017/0187572 A1*  6/2017 Wu ....................... H04L 41/145

FOREIGN PATENT DOCUMENTS

| CN | 101848161 A | 9/2010 |
| CN | 103580979 A | 2/2014 |
| CN | 104320499 A | 1/2015 |
| CN | 104734931 A | 6/2015 |

OTHER PUBLICATIONS

3rd Generation Partnership Project; Technical Specification Group Services and System Aspects; Telecommunication management; Study on network management of virtualized networks (Release 13), 3GPP TR 32.842 V1.0.0 (Mar. 2015), 48 pages.

* cited by examiner ial Application No.
METHOD AND APPARATUS FOR ESTABLISHING LINK BETWEEN VIRTUALIZED NETWORK FUNCTIONS

CROSS-REFERENCE TO RELATED APPLICATIONS

This application is a continuation of International Application No. PCT/CN2015/099943, filed on Dec. 30, 2015, which claims priority to Chinese Patent Application No. 201510147457.X, filed on Mar. 31, 2015. The disclosures of the aforementioned applications are hereby incorporated by reference in their entireties.

TECHNICAL FIELD

The present invention relates to the field of communications technologies, and in particular, to a method and an apparatus for establishing a link between virtualized network functions.

BACKGROUND

With development of a cloud technology, as a basic technology of cloud computing, a virtualization technology is widely used in an enterprise data center and the large-scale cluster computing field.

In a network functions virtualization (NFV for short) technology, one computer is virtualized as multiple virtual logical computers, that is, virtual machines (VM for short). A virtual machine usually uses a virtual network adapter or a virtual switch, or connects to a server physical network interface of an intra-frame switch or a Top of Rack switch, to perform data communication with the outside of a server.

There are multiple interfaces between network elements in an existing core network, such as Cx and Sh in an Internet Protocol multimedia subsystem (IMS for short). A link is established between these interfaces based on the Transmission Control Protocol (TCP for short), the User Datagram Protocol (UDP for short), or the Stream Control Transmission Protocol (SCTP for short) of the Internet Protocol (IP for short). Therefore, in a virtualization process, before each link is established, IP addresses and port numbers of network elements at both ends of the link need to be configured. The two network elements usually use a connection point (CP for short) to perform a link connection. Therefore, before each link is established, IP addresses of CPs at both ends of the link need to be determined. After the IP addresses of the CPs at the both ends of the link are determined, the link connection is established according to the IP addresses of the CPs. Currently, Internet Protocol addresses and port numbers at both ends of a link are manually planned and the IP addresses remain unchanged. An IP address is manually queried after a virtualized network element is deployed on a cloud platform, and then the link is established according to the queried IP address. However, because there are multiple interfaces between the network elements in the core network, and each interface corresponds to multiple links, workload is relatively heavy if operations are performed manually, and automation cannot be implemented.

SUMMARY

Embodiments of the present invention provide a method and an apparatus for establishing a link between virtualized network functions, so as to resolve a prior-art problem that a link between virtualized network functions cannot be automatically established.

According to a first aspect, an embodiment of the present invention provides a method for establishing a link between virtualized network functions, including obtaining, by a network functions virtualization orchestrator (NFVO), an internet protocol (IP) address of a connection point (CP) of a first virtualized network function (VNF) and identification information of the CP. The method also includes determining, by the NFVO according to pre-stored link information between VNFs, identification information of a second VNF corresponding to the identification information of the CP of the first VNF, where the link information includes identification information of CPs of the VNFs, a correspondence between the identification information of the CPs of the VNFs, and a correspondence between the identification information of the CPs and identification information of the VNFs. Additionally, the method includes sending, by the NFVO, the IP address of the CP of the first VNF and the identification information of the CP to the second VNF corresponding to the identification information of the second VNF. Also, the method includes starting, by the second VNF according to the IP address of the CP of the first VNF, a link connection establishment process between a CP of the second VNF and the CP of the first VNF.

With reference to the first aspect, in a first possible implementation manner of the first aspect, the determining, by the NFVO according to link information between VNFs, identification information of a second VNF corresponding to the identification information of the CP of the first VNF includes: determining, by the NFVO according to the link information between the VNFs, identification information of a virtual link (VL) corresponding to the identification information of the CP of the first VNF, determining identification information of the CP of the second VNF corresponding to the identification information of the VL, and determining identification information of the second VNF corresponding to the identification information of the CP of the second VNF.

With reference to the first aspect or the first possible implementation manner of the first aspect, in a second possible implementation manner of the first aspect, the obtaining, by an NFVO, an IP address of a CP of a first VNF and identification information of the CP includes: receiving, by the NFVO, the IP address of the CP of the first VNF sent by the first VNF, and obtaining the IP address of the CP of the first VNF and the identification information of the CP.

With reference to the second possible implementation manner of the first aspect, in a third possible implementation manner of the first aspect, the receiving, by the NFVO, the IP address of the CP of the first VNF sent by the first VNF includes: receiving, by the NFVO, the IP address of the CP of the first VNF that is sent by the first VNF when the first VNF determines that the IP address of the CP of the first VNF is not configured before this configuration; or receiving, by the NFVO, the IP address of the CP of the first VNF that is sent by the first VNF when the first VNF determines that a currently configured IP address of the CP is different from a previously configured IP address of the CP.

With reference to the first aspect or the first possible implementation manner of the first aspect, in a fourth possible implementation manner of the first aspect, the obtaining, by an NFVO, an IP address of a CP of a first VNF and identification information of the CP includes: sending, by the NFVO, a query request message for querying the IP address of the CP of the first VNF to the first VNF;

receiving, by the NFVO, a query request response message sent according to the query request message by the first VNF; and obtaining the IP address of the CP of the first VNF and the identification information of the CP; where the query request response message carries the IP address of the CP of the first VNF and the identification information of the CP.

With reference to any one of the first aspect or the first to the fourth possible implementation manners of the first aspect, in a fifth possible implementation manner of the first aspect, after the obtaining, by an NFVO, an IP address of a CP of a first VNF and identification information of the CP, and before the determining, by the NFVO according to link information between VNFs, identification information of a second VNF corresponding to the identification information of the CP of the first VNF, the method further includes: when determining that the link information include no IP address of the CP of the first VNF, correspondingly storing, in the link information by the NFVO, the obtained IP address of the CP of the first VNF and the identification information of the CP of the first VNF in the link information.

With reference to any one of the first aspect or the first to the fifth possible implementation manners of the first aspect, in a sixth possible implementation manner of the first aspect, after the obtaining, by an NFVO, an IP address of a CP of a first VNF and identification information of the CP, and before the determining, by the NFVO according to link information between VNFs, identification information of a second VNF corresponding to the identification information of the CP of the first VNF, the method further includes: determining, by the NFVO, that the link information further includes the IP address of the CP of the first VNF, and determining that the IP address of the CP of the first VNF included in the link information is different from the obtained IP address of the CP of the first VNF.

With reference to the sixth possible implementation manner of the first aspect, in a seventh possible implementation manner of the first aspect, the method further includes: if the NFVO determines that the IP address of the CP of the first VNF included in the link information is different from the obtained IP address of the CP of the first VNF, storing the obtained IP address of the CP of the first VNF in the link information by replacing the IP address of the CP of the first VNF included in the link information.

According to a second aspect, an embodiment of the present invention further provides an apparatus for establishing a link between virtualized network functions, including a first determining module, configured to determine that an IP address of a CP of a first VNF and identification information of the CP are obtained. The apparatus also includes a storage module, configured to store link information between VNFs. Additionally, the apparatus includes a second determining module, configured to determine, according to the link information between the VNFs stored by the storage module, identification information of a second VNF corresponding to the identification information of the CP of the first VNF, where the link information includes identification information of CPs of the VNFs, a correspondence between the identification information of the CPs of the VNFs, and a correspondence between the identification information of the CPs and identification information of the VNFs. Also, the apparatus includes a sending module, configured to send the IP address of the CP of the first VNF and the identification information of the CP to the second VNF corresponding to the identification information of the second VNF that is determined by the second determining module, so that the second VNF starts, according to the IP address of the CP of the first VNF, a link connection establishment process between a CP of the second VNF and the CP of the first VNF.

With reference to the second aspect, in a first possible implementation manner of the second aspect, the second determining module is specifically configured to: determine, according to the link information between the VNFs stored by the storage module, identification information of a VL corresponding to the identification information of the CP of the first VNF, determine identification information of the CP of the second VNF corresponding to the identification information of the VL, and determine identification information of the second VNF corresponding to the identification information of the CP of the second VNF.

With reference to the second aspect or the first possible implementation manner of the second aspect, in a second possible implementation manner of the second aspect, the apparatus further includes: a receiving module, configured to receive the IP address of the CP of the first VNF sent by the first VNF, so that the first determining module determines that the IP address of the CP of the first VNF and the identification information of the CP are obtained.

With reference to the second possible implementation manner of the second aspect, in a third possible implementation manner of the second aspect, the receiving module is specifically configured to: receive the IP address of the CP of the first VNF that is sent by the first VNF when the first VNF determines that the IP address of the CP of the first VNF is not configured before this configuration; or receive the IP address of the CP of the first VNF that is sent by the first VNF when the first VNF determines that a currently configured IP address of the CP is different from a previously configured IP address of the CP.

With reference to second aspect or the first possible implementation manner of the second aspect, in a fourth possible implementation manner of the second aspect, the sending module is further configured to send a query request message for querying the IP address of the CP of the first VNF to the first VNF; and the apparatus further includes a receiving module, where the receiving module is configured to receive a query request response message sent according to the query request message by the first VNF, and the first determining module determines that the IP address of the CP of the first VNF and the identification information of the CP are obtained, where the query request response message carries the IP address of the CP of the first VNF and the identification information of the CP.

With reference to any one of the second aspect or the first to the fourth possible implementation manners of the second aspect, in a fifth possible implementation manner of the second aspect, the storage module is further configured to: after the first determining module determines that the IP address of the CP of the first VNF and the identification information of the CP are obtained, and before the second determining module determines, according to the link information between the VNFs, the identification information of the second VNF corresponding to the identification information of the CP of the first VNF, when it is determined that the link information includes no IP address of the CP of the first VNF, correspondingly store the obtained IP address of the CP of the first VNF and the identification information of the CP of the first VNF in the link information.

With reference to any one of the second aspect or the first to the fifth possible implementation manners of the second aspect, in a sixth possible implementation manner of the second aspect, the apparatus further includes: a third determining module, configured to: after the first determining module determines that the IP address of the CP of the first VNF and the identification information of the CP are obtained, and before the second determining module determines, according to the link information between the VNFs, the identification information of the second VNF corresponding to the identification information of the CP of the first VNF, determine that the link information further includes the IP address of the CP of the first VNF, and determine that the IP address of the CP of the first VNF included in the link information is different from the obtained IP address of the CP of the first VNF.

With reference to the sixth possible implementation manner of the second aspect, in a seventh possible implementation manner of the second aspect, the storage module is further configured to: when the third determining module determines that the IP address of the CP of the first VNF included in the link information is different from the obtained IP address of the CP of the first VNF, store the obtained IP address of the CP of the first VNF in the link information by replacing the IP address of the CP of the first VNF included in the link information.

According to a third aspect, an embodiment of the present invention further provides a system for establishing a link between virtualized network functions, including: a network functions virtualization orchestrator NFVO and at least two virtualized network functions VNFs, where a first VNF is configured to send an IP address of a CP of the first VNF and identification information of the CP to the NFVO; the NFVO is configured to: receive the IP address of the CP of the first VNF and the identification information of the CP; determine, according to pre-stored link information between VNFs, identification information of a second VNF corresponding to the identification information of the CP of the first VNF, where the link information includes identification information of CPs of the VNFs, a correspondence between the identification information of the CPs of the VNFs, and a correspondence between the identification information of the CPs and identification information of the VNFs; and send the IP address of the CP of the first VNF and the identification information of the CP to the second VNF corresponding to the identification information of the second VNF; and the second VNF is configured to receive the IP address of the CP of the first VNF and the identification information of the CP that are sent by the NFVO, and start, according to the IP address of the CP of the first VNF, a link connection establishment process between a CP of the second VNF and the CP of the first VNF.

According to the solutions provided in the embodiments of the present invention, after an NFVO obtains an IP address and identification information of a CP of a VNF, the NFVO sends the IP address of the CP of the VNF to another VNF corresponding to the identification information of the CP of the VNF, so that the another VNF establishes a link to the VNF. In this way, a link between VNFs is automatically established.

DETAILED DESCRIPTION OF ILLUSTRATIVE EMBODIMENTS

To make the objectives, technical solutions, and advantages of the present embodiments clearer, the following further describes the present embodiments in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present embodiments.

The embodiments of the present invention provide a method and an apparatus for establishing a link between virtualized network functions (VNFs), so as to resolve a prior-art problem that a link between VNFs cannot be automatically established. The method and the apparatus are based on a same inventive concept. Because problem-resolving principles of the method and the apparatus are similar, mutual reference may be made to implementation of the apparatus and the method, and no repeated description is provided.

Figure 1:
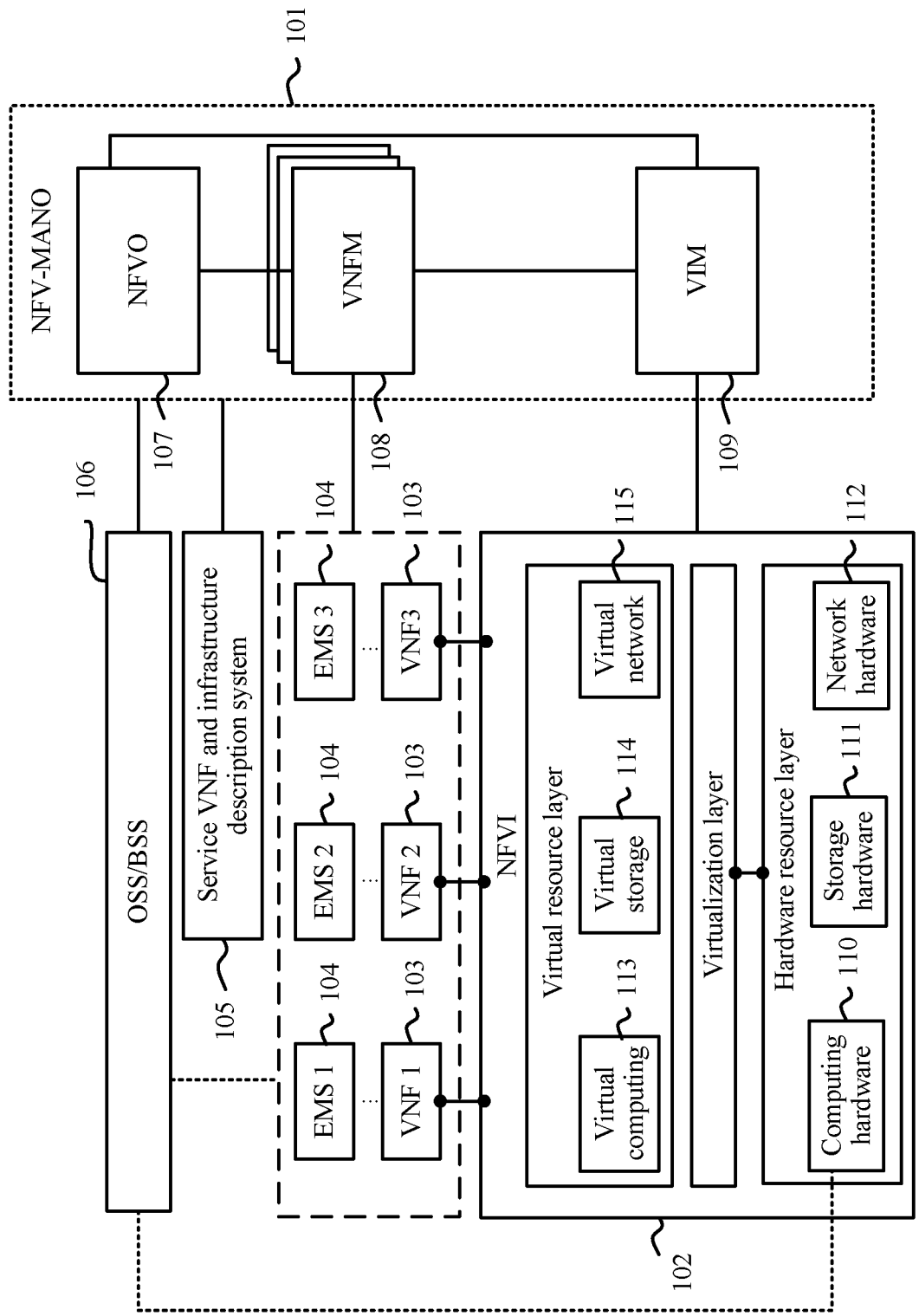
FIG. 1 is a schematic diagram of a system architecture of a network function virtualization (NFV) system according to an embodiment of the present invention.

Referring to FIG. 1, an embodiment of the present invention provides a schematic diagram of a system architecture of a network function virtualization (NFV) system. The NFV system may be implemented by using multiple networks, such as a data center network, a service provider network, and a local area network (LAN for short). As shown in FIG. 1, the NFV system may include an NFV management and orchestration system (NFV-MANO for short) 101, NFV infrastructure (NFVI for short) 102, multiple virtualized network functions (VNF for short) 103, multiple element management systems (EMS for short) 104, a service VNF and infrastructure description (Service VNF and Infrastructure Description) system 105, and one or more operation support systems/business support systems (OSS/BSS for short) 106.

The NFV-MANO 101 may include a network functions virtualization orchestrator (NFVO for short) 107, one or more VNFMs 108, and one or more virtualized infrastructure managers (VIM for short) 109. The NFVI 102 may include a hardware resource layer that includes computing hardware 110, storage hardware 111, and network hardware 112, a virtualization layer, and a virtual resource layer that includes virtual computing 113 (such as a virtual machine), virtual storage 114, and a virtual network 115.

The computing hardware 110 in the hardware resource layer may be a dedicated processor or a general-purpose processor that is configured to provide processing and computing functions. The storage hardware 111 is configured to provide a storage capability, where the storage capability may be provided by the storage hardware in (such as a local memory of a server), or may be provided by using a network (for example, a server connects to a network storage device by using a network). The network hardware 112 may be a switch, a router, and/or another network device. The network hardware 112 is configured to implement communication between multiple devices, and the multiple devices are connected in a wired or wireless manner.

The virtualization layer in the NFVI 102 is configured to provide abstraction of a hardware resource in the hardware resource layer, decouple the VNF 103 from a physical layer to which the hardware resource belongs, and provide a virtual resource for the VNF 103.

The virtual resource layer may include the virtual computing 113, the virtual storage 114, and the virtual network 115. The virtual computing 113 and the virtual storage 114 may be provided for the VNF 103 in a form of a virtual machine or another virtual container. For example, one or more VNFs 103 may be deployed on one virtual machine. The virtualization layer forms the virtual network 115 by abstracting the network hardware 112. The virtual network 115, such as virtual switches (such as Vswitches), is configured to implement communication between multiple virtual machines or between multiple other types of virtual containers that carry a VNF. Network hardware virtualization may be implemented by using a technology such as a virtual LAN (VLAN for short), a virtual private local area network service (VPLS for short), a virtual extensible local area network (VXLAN for short), or network virtualization using generic routing encapsulation (NVGRE for short).

The OSS/BSS 106 is mainly oriented to a telecom service operator, and provides comprehensive network management and service operation functions, including network management (such as fault monitoring and network information collection), charging management, customer service management, and the like. The service VNF and infrastructure description system 105 is described in detail in the ETSI GS NFV 002 V1.1.1 standard, and details are not described in this embodiment of the present invention.

The NFV-MANO 101 may be configured to monitor and manage the VNF 103 and the NFVI 102. The orchestrator 107 may communicate with one or more VNFMs 108 to implement a resource-related request, send configuration information to the VNFM 108, and collect status information of the VNF 103. In addition, the orchestrator 107 may further communicate with the VIM 109 to allocate the resource and/or reserve and exchange configuration information and status information of a virtualized hardware resource. The VNFM 108 may be configured to manage one or more VNFs 103, and execute various management functions, such as being responsible for initialization, update, query, and/or termination of the VNF 103. The VIM 109 may be configured to control and manage interaction between the VNF 103 and the computing hardware no, the storage hardware 111, the network hardware 112, the virtual computing 113, the virtual storage 114, and the virtual network 115. For example, the VIM 109 may be configured to perform an operation of allocating the resource to the VNF 103. The VNFM 108 and the VIM 109 may communicate with each other to exchange the configuration and status information of the virtualized hardware resource.

The NFVI 102 includes hardware and software, which jointly establish a virtualized environment to deploy, manage, and execute the VNF 103. In other words, the hardware resource layer and the virtual resource layer are used to provide a virtual resource for each VNF 103, such as a virtual machine and/or a virtual container in another form.

As shown in FIG. 1, the VNFM 108 may communicate with the VNF 103 and the EMS 104 to perform life cycle management of the VNF 103 and exchange the configuration/status information. The VNF 103 is virtualization of at least one network function, and the network function is previously provided by a physical network device. In an implementation manner, the VNF 103 may be a virtualized mobility management entity (MME) node, and be configured to provide all network functions provided by a typical non-virtualized MME device. In another implementation manner, the VNF 103 may be configured to implement functions of some components of all components provided by the non-virtualized MME device. One or more VNFs 103 may be deployed on one virtual machine (or one virtual container in another form). The EMS 104 may be configured to manage the one or more VNFs.

In the specification of the NFV-MANO 101, a (Connection Point, CP for short) is used to describe information about a virtual or physical interface between a network service, a VNF, a VNF part, a physical network function (PNF), and a virtual link.

Figure 2:
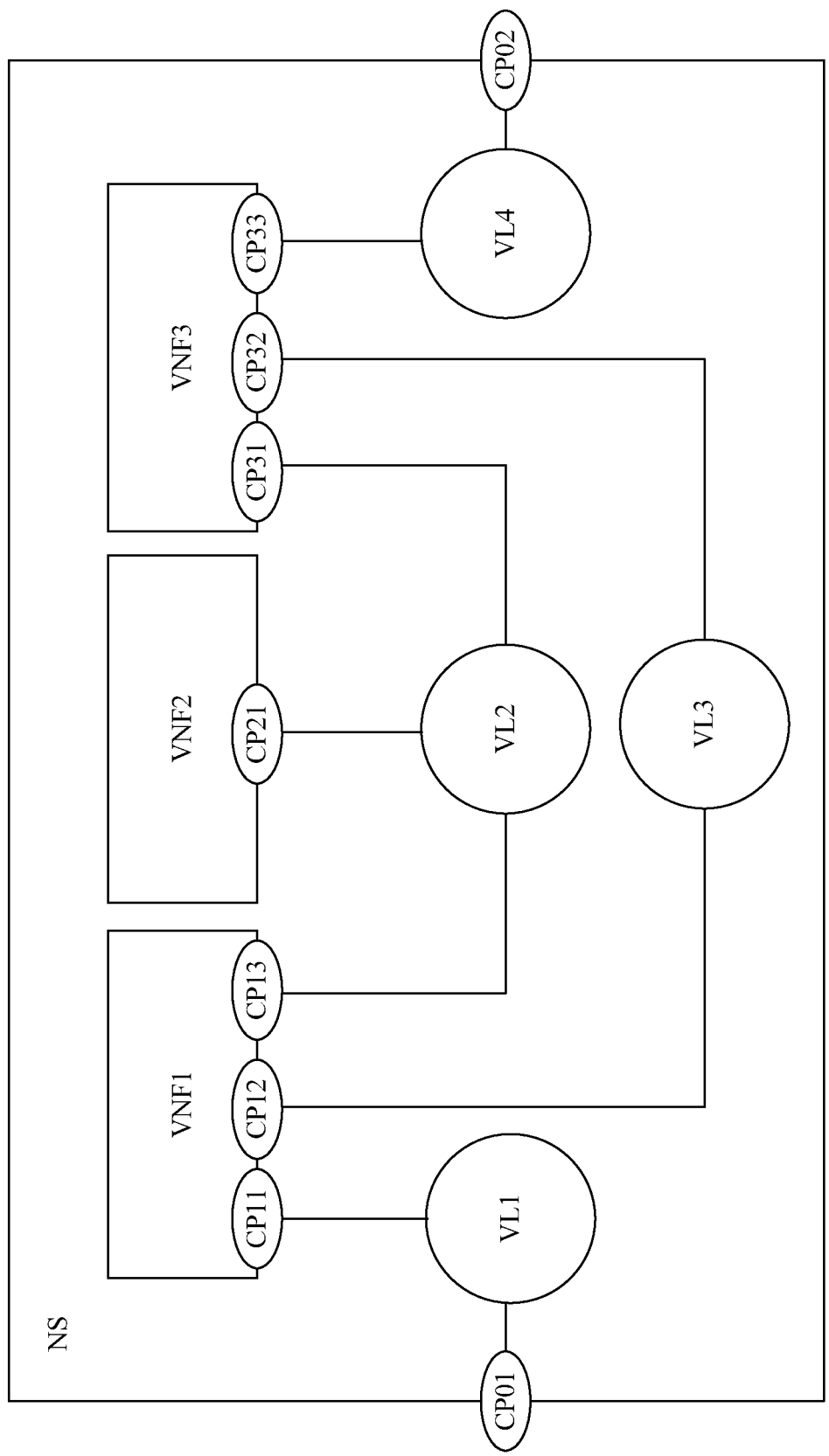
FIG. 2 is a schematic diagram of a relationship between a virtualized network function (VNF) and a virtual link (VL) and a connection point (CP) according to an embodiment of the present invention.

In the specification of the NFV-MANO 101, a virtual link (VL for short) is used to describe a link relationship between the VNFs. Each VL uses a virtual link descriptor (VLD) to describe information about the VL, such as identification information, a vendor, a version, a quantity of endpoints, a throughput, service quality, a connection point (CP for short) set, a connection type, and a security requirement. The CP described in this embodiment of the present invention refers to a virtual interface between VLs. One VL may have two or more CPs, and one VNF may have one or more CPs, such as a relationship diagram shown in FIG. 2. Each VNF descriptor (VNFD for short) describes a CP of the VNF, and includes a correspondence between identification information of each VNF and identification information of each CP. Each VLD also describes the involved CP. In this embodiment of the present invention, link information between VNFs may include each VNF descriptor, a virtual relationship descriptor, and the like.

Specifically, in this embodiment of the present invention, a system including two VNFs: a first VNF and a second VNF is used as an example.

The first VNF is configured to send an IP address of a connection point (CP) of the first VNF and identification information of the CP to an NFVO.

The NFVO is configured to: receive the IP address of the CP of the first VNF and the identification information of the CP; determine, according to pre-stored link information between VNFs, identification information of the second VNF corresponding to the identification information of the CP of the first VNF, where the link information includes identification information of CPs of the VNFs, a correspondence between the identification information of the CPs of the VNFs, and a correspondence between the identification information of the CPs and identification information of the VNFs; and send the IP address of the CP of the first VNF and the identification information of the CP to the second VNF corresponding to the identification information of the second VNF.

The second VNF is configured to receive the IP address of the CP of the first VNF and the identification information of the CP that are sent by the NFVO, and start, according to the IP address of the CP of the first VNF, a link connection establishment process between a CP of the second VNF and the CP of the first VNF.

Figure 3:
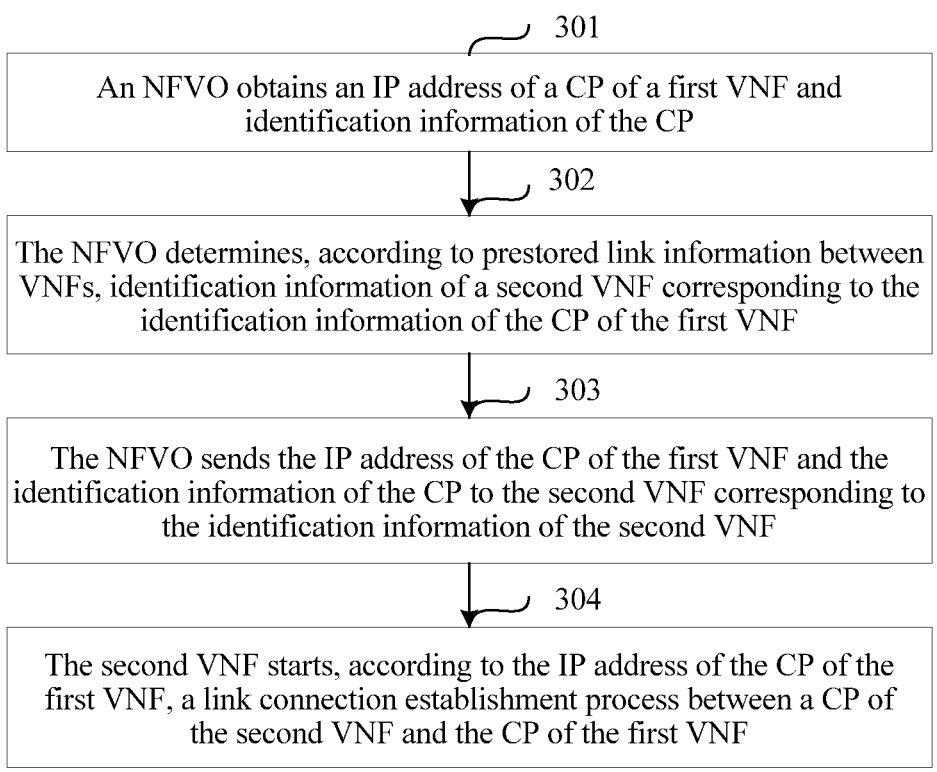
FIG. 3 is a flowchart of a method for establishing a link between virtualized network functions according to an embodiment of the present invention.

An embodiment of the present invention provides a method for establishing a link between virtualized network functions. As shown in FIG. 3, the method includes the following steps.

Step 301: An NFVO obtains an IP address of a CP of a first VNF and identification information of the CP.

The identification information of the CP may be preconfigured by the NFVO for the VNF by using a VNF descriptor (VNFD for short), or may be configured by an operator for the VNF by using a man-machine interface.

During network service deployment, the NFVO sets link information between VNFs in the NFVO by using a virtual link descriptor (VLD for short). The link information between the VNFs includes a quantity of involved CPs, identification information of the CPs, a connection type, and the like.

Specifically, the NFVO may obtain the IP address of the CP of the first VNF and the identification information of the CP in the following manners.

First implementation manner.

The NFVO receives the IP address of the CP of the first VNF and the identification information of the CP that are sent by the first VNF, and obtains the IP address of the CP of the first VNF and the identification information of the CP.

After a virtual machine of the first VNF is started, the first VNF completes application for the IP address of the CP, and then the first VNF sends the applied-for IP address of the CP and the identification information of the CP to the NFVO. Specifically, the first VNF may send the applied-for IP address of the CP and the identification information of the CP to the NFVO by using a VNFM corresponding to the first VNF.

After the virtual machine of the VNF is restarted or reestablished, the IP address of the CP of the VNF may usually be reallocated, and a reallocated IP address of the CP is not necessarily the original IP address. Therefore, the NFVO may obtain a new IP address of the CP of the first VNF in the foregoing manner, and send the new IP address of the CP of the first VNF to another VNF corresponding to another CP corresponding to the identification information of the CP of the first VNF, so that the another VNF establishes a link connection to the first VNF according to the IP address of the CP of the first VNF and the identification information of the CP.

Specifically, the NFVO receives the IP address of the CP of the first VNF that is sent by the first VNF when the first VNF determines that the IP address of the CP of the first VNF is not configured before this configuration; or the NFVO receives the IP address of the CP of the first VNF that is sent by the first VNF when the first VNF determines that a currently configured IP address of the CP is different from a previously configured IP address of the CP.

After a Dynamic Host Configuration Protocol (DHCP for short) service is enabled on a cloud platform, a VNF may apply to the DHCP service for an IP address of a CP. Certainly, an IP address may be allocated to each virtual machine when the virtual machine is deployed on a cloud platform. Therefore, when the first VNF applies to the DHCP for the IP address of the CP or determines that the first VNF has been allocated the IP address of the CP, the first VNF determines that the IP address of the CP of the first VNF is configured.

Second implementation manner.

The NFVO sends a query request message for querying the IP address of the CP of the first VNF to the first VNF; the NFVO receives a query request response message sent according to the query request message by the first VNF, and obtains the IP address of the CP of the first VNF and the identification information of the CP, where the query request response message carries the IP address of the CP of the first VNF and the identification information of the CP.

Specifically, the NFVO periodically sends a query request message for querying the IP address of the CP of each VNF to each VNF managed by the NFVO. Therefore, after receiving the query request message, each VNF adds the IP address of the CP of the VNF and identification information of the CP to a query request response message and sends the query request response message to the NFVO.

Step 302: The NFVO determines, according to pre-stored link information between VNFs, identification information of a second VNF corresponding to the identification information of the CP of the first VNF.

The link information includes identification information of CPs of the VNFs, a correspondence between the identification information of the CPs of the VNFs, and a correspondence between the identification information of the CPs and identification information of the VNFs.

The correspondences may be stored in the NFVO in a table form. When the NFVO performs network service deployment, the link information may be manually stored in the NFVO by using a man-machine interface.

It should be noted that the identification information of the CP of the first VNF may correspond to multiple VNFs, and therefore there may be multiple second VNFs.

The NFVO determines, according to the link information between the VNFs, identification information of all other VNFs corresponding to the identification information of the CP of the first VNF.

Step 303: The NFVO sends the IP address of the CP of the first VNF and the identification information of the CP to the second VNF corresponding to the identification information of the second VNF.

Step 304: The second VNF starts, according to the IP address of the CP of the first VNF, a link connection establishment process between a CP of the second VNF and the CP of the first VNF.

According to the solution provided in this embodiment of the present invention, after an NFVO obtains an IP address and identification information of a CP of a VNF, the NFVO sends the IP address of the CP of the VNF to another VNF corresponding to the identification information of the CP of the VNF, so that the another VNF establishes a link to the VNF. In this way, a link between VNFs is automatically established.

Further, the NFVO may specifically determine, according to the link information between the VNFs in the following manner, the identification information of the second VNF corresponding to the identification information of the CP of the first VNF:

The NFVO determines, according to the link information between the VNFs, identification information of a virtual link (VL) corresponding to the identification information of the CP of the first VNF, determines identification information of the CP of the second VNF corresponding to the identification information of the VL, and determines identification information of the second VNF corresponding to the identification information of the CP of the second VNF.

The correspondence between the identification information of the CPs of the VNFs in the link information is implemented by using VLs, for example, as shown in Table 1.

TABLE 1

| VL1 | CP11 |
|---|---|
|  | CP21 |
| VL2 | CP12 |
|  | CP22 |
|  | CP31 |
| VL3 | CP13 |
|  | CP32 |
| VL4 | CP23 |
|  | CP33 |

The correspondence between the identification information of the CPs and the identification information of the VNFs is implemented by using a CP table of the VNFs, for example, as shown in Table 2.

TABLE 2

| VNF1 | CP11 |
|---|---|
|  | CP12 |
|  | CP13 |
| VNF2 | CP21 |
|  | CP22 |
|  | CP23 |
| VNF3 | CP31 |
|  | CP32 |
|  | CP33 |

According to the solution provided in this embodiment of the present invention, after an NFVO obtains an IP address of a CP of a VNF and identification information of the CP, the NFVO sends the IP address of the CP of the VNF and the identification information of the CP to another VNF corresponding to the identification information of the VNF, so that the another VNF establishes a link to the VNF. In this way, a link between VNFs is automatically established.

Optionally, after the NFVO obtains the IP address of the CP of the first VNF and the identification information of the CP, and before the NFVO determines, according to the link information between the VNFs, the identification information of the second VNF corresponding to the identification information of the CP of the first VNF, when determining that the link information include no IP address of the CP of the first VNF, the NFVO correspondingly stores, in the link information, the obtained IP address of the CP of the first VNF and the identification information of the CP of the first VNF in the link information.

Optionally, after the NFVO obtains the IP address of the CP of the first VNF and the identification information of the CP, and before the NFVO determines, according to the link information between the VNFs, the identification information of the second VNF corresponding to the identification information of the CP of the first VNF, the NFVO determines that the link information further includes an IP address of the CP of the first VNF, and determines that the IP address of the CP of the first VNF included in the link information is different from the obtained IP address of the CP of the first VNF.

If the NFVO determines that the IP address of the CP of the first VNF included in the link information is different from the obtained IP address of the CP of the first VNF, the NFVO stores the obtained IP address of the CP of the first VNF in the link information by replacing the IP address of the CP of the first VNF included in the link information.

Optionally, when the NFVO determines that the link information further includes an IP address of the CP of the first VNF, and determines that the IP address of the CP of the first VNF included in the link information is the same as the obtained IP address of the CP of the first VNF, it indicates that the IP address of the CP of the first VNF is not changed, and a link connection does not need to be reestablished, that is, after the NFVO obtains the IP address of the CP of the first VNF and the identification information of the CP, the NFVO does not need to send the IP address of the CP of the first VNF to the second VNF corresponding to the identification information of the second VNF.

Optionally, the second VNF may specifically start, according to the IP address of the CP of the first VNF, a link connection establishment process between the CP of the second VNF and the CP of the first VNF in the following manner.

The second VNF sends a link establishment request message to the first VNF according to the IP address of the CP of the first VNF. The link establishment request message carries the identification information of the CP of the second VNF.

After determining that the IP address of the CP corresponding to the identification information of the CP of the second VNF is obtained, the first VNF accepts the link establishment request, and sends a link establishment response message to the second VNF.

Alternatively, when the second VNF determines that the IP address of the CP of the first VNF is received, if a link establishment request message sent by the first VNF is received, and the link establishment request message carries the identification information of the CP of the first VNF, the second VNF accepts the link establishment request, and sends a link establishment response message to the first VNF.

For details, refer to a prior-art link connection process between the CP of the second VNF and the CP of the first VNF, and details are not described in this embodiment of the present invention.

The following specifically describes this embodiment of the present invention by using specific application scenarios.

Embodiment 1

A connection relationship between VNFs may first be planned in advance, this is, link information between the VNFs is preset. Specifically, the link information between the VNFs may be read by using an NFVO. The link information between the VNFs includes information about a CP that is used in information such as a VNFD forwarding graph descriptor (VNFFG for short) (used to describe a virtual link relationship between the VNFs) or a VLD (used to describe a correspondence between identification information of CPs that is used by each virtual link). Alternatively, the link information is preset in the NFVO by using a man-machine interface. For example, the link information may be stored in a database of the NFVO by using the man-machine interface.

The information about the CP may include: an identifier and a type (a virtual port, a virtual network adapter address, a physical port, a physical network adapter address, an endpoint of a virtual private network (VPN for short), or the like). The VNFD forwarding graph describes VLs used by VNFs, the VLD describes a correspondence between VLs and used identification information of CPs, and a VNFD describes a correspondence between the identification information of the CPs and identification information of the VNFs.

Figure 4:
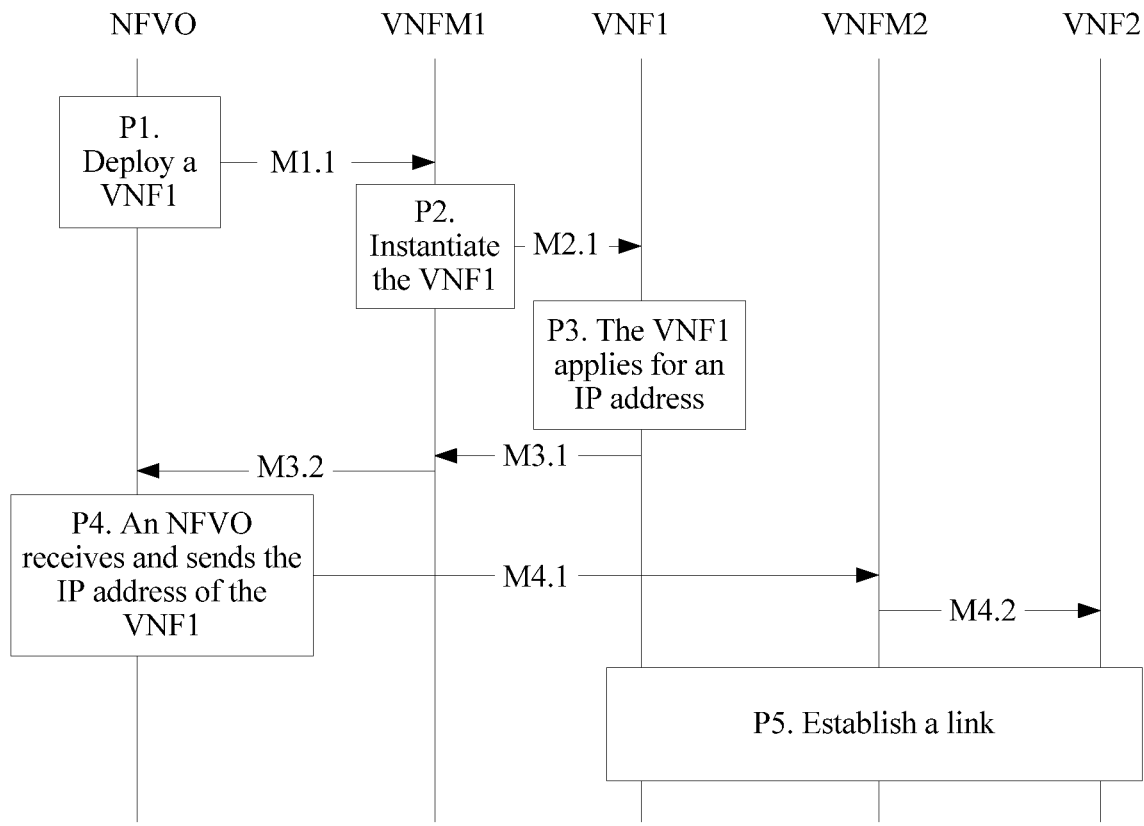
FIG. 4 is a schematic diagram of a method for establishing a link between virtualized network functions according to Embodiment 1 of the present invention.

The following uses a virtual link VL1 as an example for description. CPs corresponding to the VL1 are a CP1 of a VNF1 and a CP2 of a VNF2. The VNF1 is extended to establish a link to the VNF2, as shown in FIG. 4.

P1. Deploy the VNF1. The NFVO first deploys the VNF1, including applying for a virtual machine, installing software on the virtual machine, and the like.

Optionally, in a process of deploying the VNF1, the NFVO may report a message M1.1 to send identification information of the CP (such as the CP1) configured for the VNF1 to a P2. Instantiate the VNF1. The VNFM1 instantiates the virtual machine of the VNF1 and starts the virtual machine of the VNF1.

Optionally, the VNFM1 may use a message M2.1 to send the identification information of the CP (the CP1) of the VNF1 to the VNF1.

P3. The VNF1 applies for an IP address of the CP1. After the virtual machine of the VNF1 is started, the VNF1 obtains the allocated IP address of the CP1 by using the DHCP, and uses a message M3.1 and a message M3.2 to forward the IP address of the CP1 and the identification information of the CP (that is, the CP1) to the NFVO by using the VNFM1.

In this case, if the VNF1 has obtained an IP address of a CP (such as the CP2) of the VNF2, the VNF1 starts a link establishment process.

P4. The NFVO receives and sends the IP address of the CP1 of the VNF1 and the identification information of the CP (the CP1). After the identification information of the CP of the VNF1 and the IP address of the CP1 are received, identification information of another VNF (the VNF2 is used as an example in the present embodiments) corresponding to the CP1 is determined according to preset link information between VNFs, and the IP address of the CP and the identification information of the CP (the CP1) are sent to the VNF2 by using a message M4.1 and a message M4.2.

Optionally, when received, the IP address of the CP1 of the VNF1 is stored in the link information. Specifically, the IP address of the CP1 of the VNF1 is stored in information about the CP1.

P5. Establish a link. After the VNF2 receives the IP address of the CP1 of the VNF1 and the identification information of the CP (the CP1), the VNF2 starts or accepts a process of establishing a link to the VNF1.

Embodiment 2

On a cloud computing platform, after a virtual machine of a VNF is restarted or reestablished, an IP address needs to be reconfigured, and the configured IP address and an original IP address may be different. In this scenario, the VNF needs to notify a peer-end VNF of the changed IP address.

Referring to Embodiment 1, link information between VNFs is preset in an NFVO, or is obtained in advance. Details are not described again in this embodiment.

Figure 5:
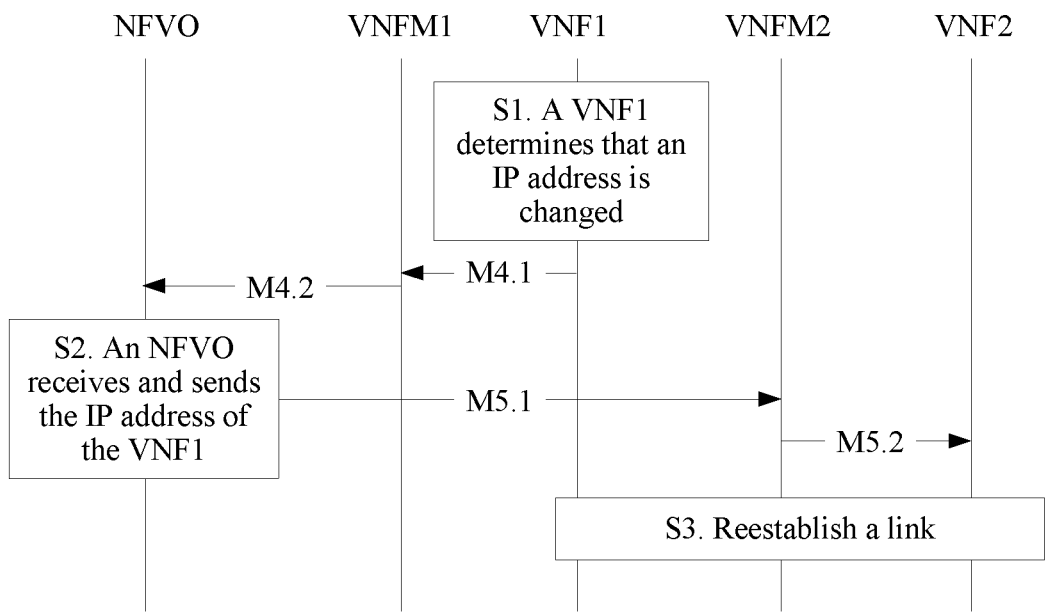
FIG. 5 is a schematic diagram of a method for establishing a link between virtualized network functions according to Embodiment 2 of the present invention.

The following uses a virtual link VL1 as an example for description. CPs corresponding to the VL1 are a CP1 of a VNF1 and a CP2 of a VNF2. An IP address of the CP1 is changed, as shown in FIG. 5.

S1. The VNF1 determines that the IP address of the CP1 of the VNF1 is changed. That is, the VNF1 re-obtains an allocated IP address of the CP1 by using the DHCP.

The VNF1 uses a message M4.1 and a message M4.2 to forward the IP address of the CP and identification information of the CP (the CP1) to the NFVO by using a VNFM1.

If the VNF1 has obtained an IP address of the CP2 of the VNF2, the VNF1 starts or accepts a link establishment process.

S2. The NFVO receives and sends the IP address of the CP of the VNF1 and the identification information of the CP (the CP1) that are sent by the VNF1. After an IP address of the VNF1 and a CP identifier (the CP1) are received, identification information of another VNF (the VNF2 is used as an example in the present embodiments) corresponding to the CP1 is determined according to preset link information between VNFs, and the IP address of the CP of the VNF1 and the identification information of the CP (the CP1) are sent to the VNF2 by using a message M5.1 and a message M5.2.

Optionally, after receiving the identification information of the CP (the CP1) of the VNF1 and the IP address of the CP, the NFVO determines that the link information further includes an IP address of the CP1 of the VNF1, and determines that the IP address of the CP1 of the VNF1 included in the link information is different from the received IP address of the CP1 of the VNF1. Then, identification information of another VNF (the VNF2 is used as an example in the present embodiments) corresponding to the CP1 is determined according to preset link information between VNFs, that is, the determined identification information of the CP (the CP1) corresponds to the CP2, and identification information of a VNF corresponding to the CP2 is the VNF2. Then, the IP address of the CP1 of the VNF1 and the CP identifier (the CP1) are sent to the VNF2 by using the message M4.1 and the message M4.2.

If it is determined that the IP address of the CP1 of the VNF1 included in the link information is the same as the received IP address of the CP1 of the VNF1, a subsequent operation may not be performed.

S3. Reestablish a link. After the VNF2 receives the IP address of the CP1 of the VNF1 and the identification information of the CP (the CP1), the VNF2 starts or accepts a process of establishing a link to the VNF1.

Embodiment 3

Referring to Embodiment 1, link information between VNFs is preset in an NFVO, or is obtained in advance. Details are not described again in this embodiment.

Figure 6:
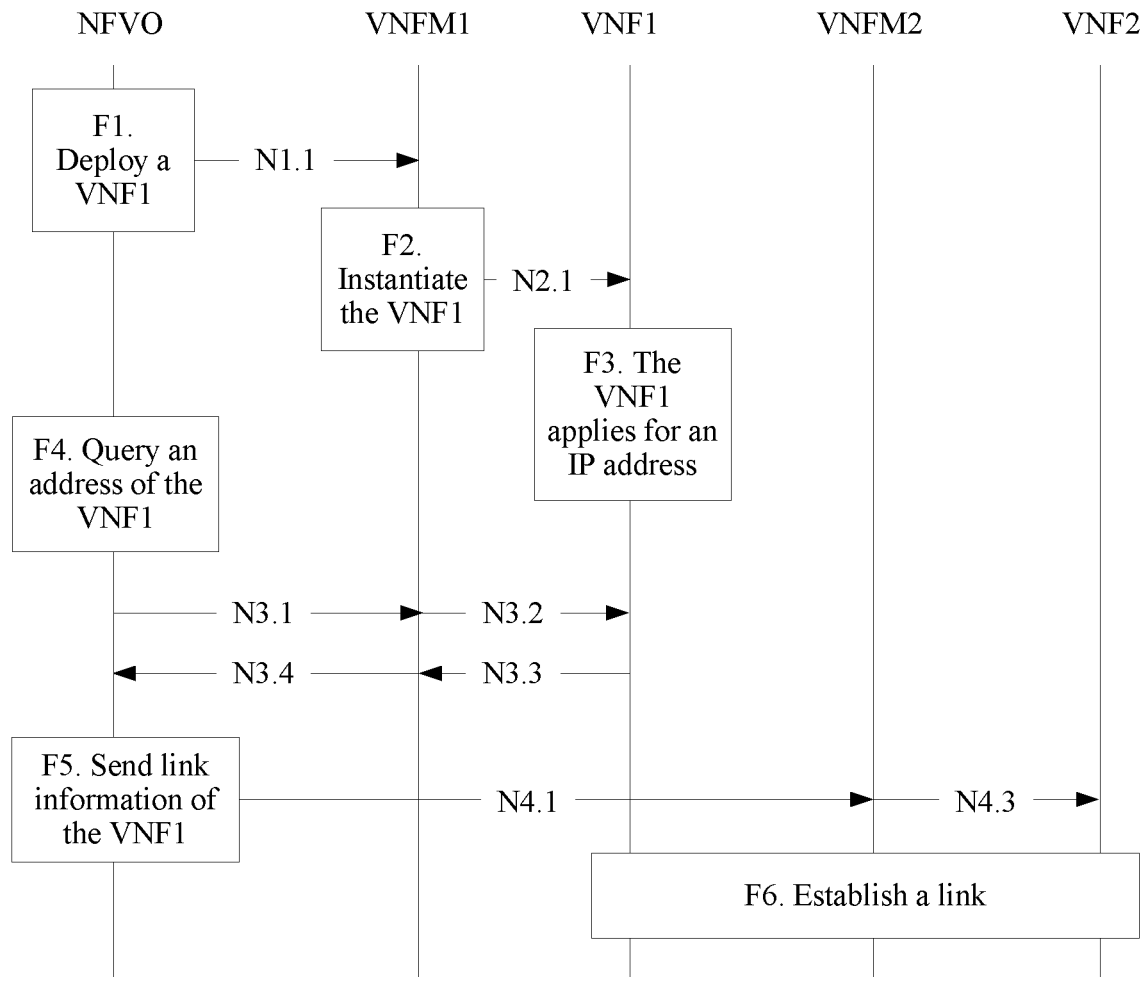
FIG. 6 is a schematic diagram of a method for establishing a link between virtualized network functions according to Embodiment 3 of the present invention.

The following uses a virtual link VL1 as an example for description. CPs corresponding to the VL1 are a CP1 of a VNF1 and a CP2 of a VNF2. The VNF1 is extended to establish a link to the VNF2, as shown in FIG. 6.

F1. Deploy the VNF1. The NFVO first deploys the VNF1, including applying for a virtual machine, installing software on the virtual machine, and the like.

Optionally, in a process of deploying the VNF1, the NFVO reports a message N1.1 to send information about the CP (the CP1) configured for the VNF1 to a VNFM1.

F2. Instantiate the VNF1. The VNFM1 instantiates the virtual machine of the VNF1 and starts the virtual machine of the VNF1.

Optionally, the VNFM1 uses a message N2.1 to send the identification information of the CP (the CP1) of the VNF to the VNF1.

F3. The VNF1 applies for an IP address. After the virtual machine of the VNF1 is started, the VNF1 obtains an allocated IP address by using the DHCP.

F4. The NFVO queries the IP address of the CP1 of the VNF1. A query request for querying an IP address of each CP of a VNF may be periodically sent to each VNF, to determine that an IP address of a CP of the VNF is not stored in the link information.

After receiving the query request by using a message N3.1 and a message N3.2, the VNF1 sends the IP address of the CP1 and the identification information of the CP (the CP1) to the NFVO by using a message N3.3 and a message N3.4. If determining that a queried IP address of the CP1 of the VNF1 is not stored in the link information, the NFVO determines that the IP address of the CP1 of the VNF1 is queried.

F5. Send link information of the VNF1. Identification information of another VNF (the VNF2 is used as an example in the present embodiments) corresponding to another CP corresponding to the CP1 of the VNF1 is determined according to the link information between the VNFs, and the IP address of the CP1 of the VNF1 and the identification information of the CP (the CP1) are sent to the VNF2 by using a message N4.1 and a message N4.2.

Optionally, after the IP address of the CP1 of the VNF1 is queried, the IP address of the CP1 of the VNF1 is stored in the link information. Specifically, the IP address of the CP1 of the VNF1 is stored in record information of the CP1 in the link information.

F6. Establish a link. After the VNF2 receives the IP address of the CP1 of the VNF1 and the identification information of the CP (the CP1), the VNF2 starts or accepts a process of establishing a link to the VNF1.

Embodiment 4

On a cloud computing platform, after a virtual machine of a VNF is restarted or reestablished, an IP address needs to be reconfigured, and the configured IP address and an original IP address may be different. In this scenario, the VNF needs to notify a peer-end VNF of the changed IP address.

Referring to Embodiment 3, link information between VNFs is preset in an NFVO, or is obtained in advance. Details are not described again in this embodiment.

Figure 7:
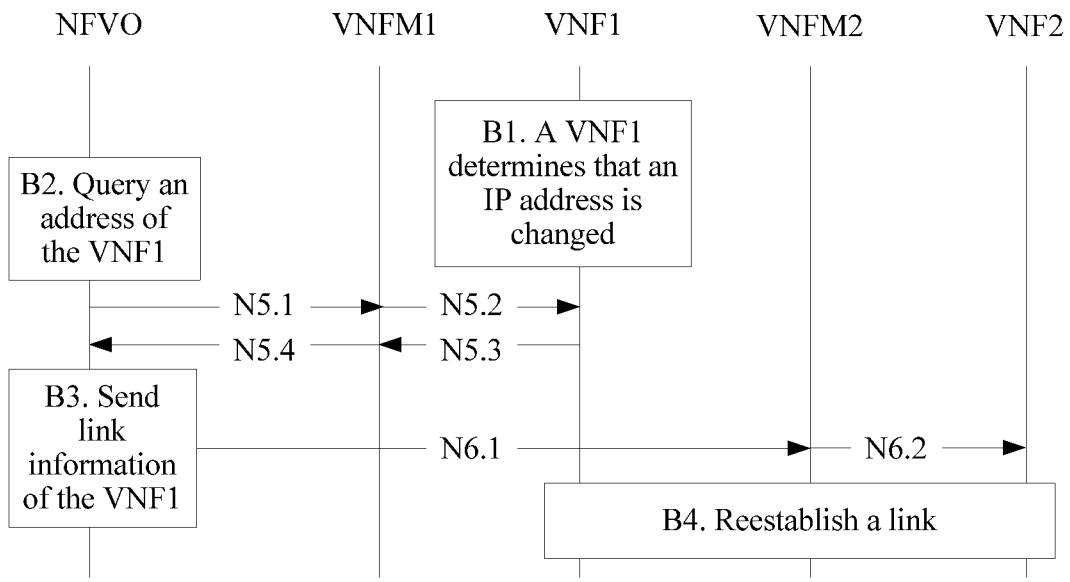
FIG. 7 is a schematic diagram of a method for establishing a link between virtualized network functions according to Embodiment 4 of the present invention.

The following uses a virtual link VL1 as an example for description. CPs corresponding to the VL1 are a CP1 of a VNF1 and a CP2 of a VNF2. On the basis of Embodiment 3, an IP address of the CP1 of the VNF1 is changed, as shown in FIG. 7.

B1. The VNF1 determines that the IP address of the CP1 is changed. That is, the VNF1 re-obtains an allocated IP address of the CP1 by using the DHCP.

B2. The NFVO queries the IP address of the CP1 of the VNF1. A query request for querying an IP address of each CP of a VNF may be periodically sent to each VNF.

After receiving the query request by using a message N5.1 and a message N5.2, the VNF1 sends the IP address of the CP1 and identification information of the CP (the CP1) to the NFVO by using a message N5.3 and a message N5.4. After receiving the IP address of the CP1 and the identification information of the CP (the CP1) that are sent by the VNF1, the NFVO determines that the received IP address of the CP1 of the VNF1 is different from an IP address of the CP1 of the VNF1 stored in the link information. The NFVO determines that the IP address of the CP1 of the VNF1 is queried.

B3. Send link information of the VNF1. After determining that the IP address of the CP1 of the VNF1 is queried, the NFVO determines, according to the preset link information between the VNFs, an identifier of another VNF (the VNF2 is used as an example in the present embodiments) corresponding to a CP corresponding to the CP1 of the VNF1, and sends the IP address of the CP1 of the VNF1 and a CP identifier (the CP1) to the VNF2 by using a message N6.1 and a message N6.2.

Optionally, after the IP address of the CP1 of the VNF1 is queried, the IP address of the CP1 of the VNF1 is stored in the link information.

B4. Establish a link. After the VNF2 receives the IP address of the CP1 of the VNF1 and the CP identifier (the CP1), the VNF2 starts or accepts a process of establishing a link to the VNF1.

Figure 8:
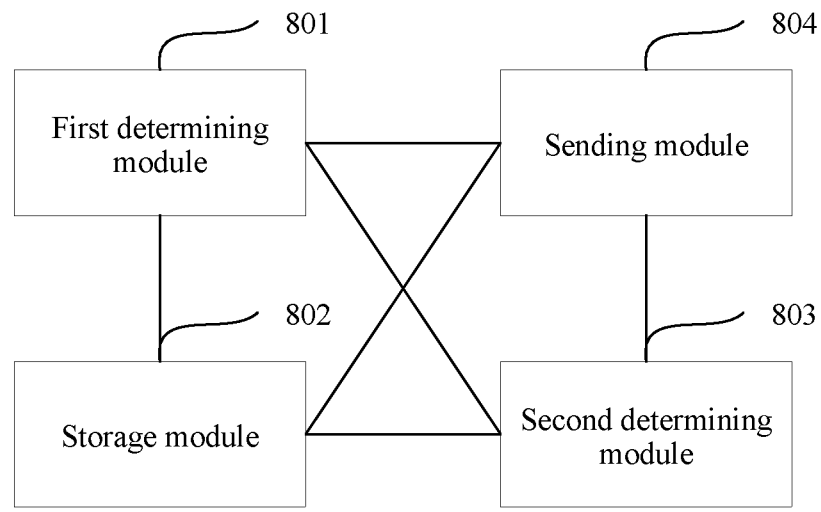
FIG. 8 is a schematic diagram of an apparatus for establishing a link between virtualized network functions according to an embodiment of the present invention.

An embodiment of the present invention further provides an apparatus for establishing a link between virtualized network functions. The apparatus may be disposed in an NFVO. As shown in FIG. 8, the apparatus includes: a first determining module 801, configured to determine that an IP address of a CP of a first VNF and identification information of the CP are obtained; a storage module 802, configured to store link information between VNFs; a second determining module 803, configured to determine, according to the link information between the VNFs stored by the storage module 802, identification information of a second VNF corresponding to the identification information of the CP of the first VNF, where the link information includes identification information of CPs of the VNFs, a correspondence between the identification information of the CPs of the VNFs, and a correspondence between the identification information of the CPs and identification information of the VNFs; and a sending module 804, configured to send the IP address of the CP of the first VNF and the identification information of the CP to the second VNF corresponding to the identification information of the second VNF that is determined by the second determining module 803, so that the second VNF starts, according to the IP address of the CP of the first VNF, a link connection establishment process between a CP of the second VNF and the CP of the first VNF.

According to the solution provided in this embodiment of the present invention, after an NFVO obtains an IP address and identification information of a CP of a VNF, the NFVO sends the IP address of the CP of the VNF to another VNF corresponding to the identification information of the CP of the VNF, so that the another VNF establishes a link to the VNF. In this way, a link between VNFs is automatically established.

Optionally, the second determining module 803 is specifically configured to: determine, according to the link information between the VNFs stored by the storage module 802, identification information of a VL corresponding to the identification information of the CP of the first VNF, determine identification information of the CP of the second VNF corresponding to the identification information of the VL, and determine identification information of the second VNF corresponding to the identification information of the CP of the second VNF.

Optionally, when determining that the IP address of the CP of the first VNF and the identification information of the CP are obtained, the apparatus further includes a receiving module, configured to receive the IP address of the CP of the first VNF sent by the first VNF, so that the first determining module 801 determines that the IP address of the CP of the first VNF and the identification information of the CP are obtained.

Optionally, the receiving module is specifically configured to: receive the IP address of the CP of the first VNF that is sent by the first VNF when the first VNF determines that the IP address of the CP of the first VNF is not configured before this configuration; or receive the IP address of the CP of the first VNF that is sent by the first VNF when the first VNF determines that a currently configured IP address of the CP is different from a previously configured IP address of the CP.

Optionally, when it is determined that the IP address of the CP of the first VNF and the identification information of the CP are obtained, the sending module is further configured to send a query request message for querying the IP address of the CP of the first VNF to the first VNF; and the apparatus further includes a receiving module, where the receiving module is configured to receive a query request response message sent according to the query request message by the first VNF, and the first determining module determines that the IP address of the CP of the first VNF and the identification information of the CP are obtained, where the query request response message carries the IP address of the CP of the first VNF and the identification information of the CP.

Optionally, the storage module is further configured to: after the first determining module 801 determines that the IP address of the CP of the first VNF and the identification information of the CP are obtained, and before the second determining module 803 determines, according to the link information between the VNFs, the identification information of the second VNF corresponding to the identification information of the CP of the first VNF, when it is determined that the link information includes no IP address of the CP of the first VNF, correspondingly store, in the link information, the obtained IP address of the CP of the first VNF and the identification information of the CP of the first VNF in the link information.

Optionally, the apparatus may further include a third determining module, configured to: after the first determining module 801 determines that the IP address of the CP of the first VNF and the identification information of the CP are obtained, and before the second determining module 803 determines, according to the link information between the VNFs, the identification information of the second VNF corresponding to the identification information of the CP of the first VNF, determine that the link information further includes an IP address of the CP of the first VNF, and determine that the IP address of the CP of the first VNF included in the link information is different from the obtained IP address of the CP of the first VNF.

Further, the storage module 802 is further configured to: when the third determining module determines that the IP address of the CP of the first VNF included in the link information is different from the obtained IP address of the CP of the first VNF, store the obtained IP address of the CP of the first VNF in the link information by replacing the IP address of the CP of the first VNF included in the link information.

It should be noted that, module division in this embodiment of the present invention is an example, is merely logical function division, and may be other division in actual implementation. For example, the first determining module and the second determining module may be a same determining module or different determining modules, or some features may be ignored or not performed. In addition, functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

Figure 9:
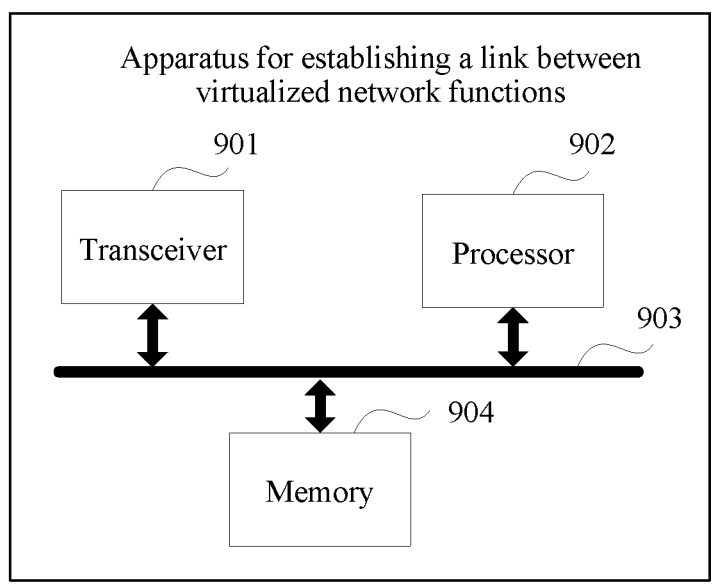
FIG. 9 is a schematic diagram of another apparatus for establishing a link between virtualized network functions according to an embodiment of the present invention.

Based on the foregoing embodiments, an embodiment of the present invention further provides an apparatus for establishing a link between virtualized network functions. The apparatus may be disposed in an NFVO. As shown in FIG. 9, the apparatus for establishing a link between virtualized network functions includes a transceiver 901, a processor 902, a bus 903, and a memory 904.

The transceiver 901, the processor 902, and the memory 904 are interconnected by using the bus 903. The bus 903 may be a peripheral component interconnect (PCI for short) bus, an Extended Industry Standard Architecture (EISA for short) bus, or the like. The bus may include an address bus, a data bus, a control bus, and the like. For convenience of representation, the bus is represented by using only one thick line in FIG. 9; however, it does not indicate that there is only one bus or only one type of bus.

The memory 904 is configured to store link information between VNFs, and is configured to store an execution program.

The processor 902 is configured to execute the execution program stored in the memory 904, to perform the following operations: the processor 902 obtains an IP address of a CP of a first VNF and identification information of the CP; determines, according to link information between VNFs stored in the memory 904, identification information of a second VNF corresponding to the identification information of the CP of the first VNF, where the link information includes identification information of CPs of the VNFs, a correspondence between the identification information of the CPs of the VNFs, and a correspondence between the identification information of the CPs and identification information of the VNFs; and sends the IP address of the CP of the first VNF and the identification information of the CP to the second VNF corresponding to the identification information of the second VNF, so that the second VNF starts, according to the IP address of the CP of the first VNF, a link connection establishment process between a CP of the second VNF and the CP of the first VNF.

Optionally, the processor 902 determines, according to the link information between the VNFs, identification information of a VL corresponding to the identification information of the CP of the first VNF, determines identification information of the CP of the second VNF corresponding to the identification information of the VL, and determines identification information of the second VNF corresponding to the identification information of the CP of the second VNF.

The processor 902 may specifically obtain the IP address of the CP of the first VNF and the identification information of the CP in the following implementation manner.

First implementation manner.

The processor 902 receives the IP address of the CP of the first VNF sent by the first VNF, and obtains the IP address of the CP of the first VNF and the identification information of the CP.

Specifically, the processor 902 receives the IP address of the CP of the first VNF that is sent by the first VNF when the first VNF determines that the IP address of the CP of the first VNF is not configured before this configuration; or the processor 902 receives the IP address of the CP of the first VNF that is sent by the first VNF when the first VNF determines that a currently configured IP address of the CP is different from a previously configured IP address of the CP.

Second implementation manner.

The processor 902 sends a query request message for querying the IP address of the CP of the first VNF to the first VNF; the processor 902 receives a query request response message sent according to the query request message by the first VNF, and obtains the IP address of the CP of the first VNF and the identification information of the CP, where the query request response message carries the IP address of the CP of the first VNF and the identification information of the CP.

Optionally, after the processor 902 obtains the IP address of the CP of the first VNF and the identification information of the CP, and before the processor 902 determines, according to the link information between the VNFs, the identification information of the second VNF corresponding to the identification information of the CP of the first VNF, the operations further include: when determining that the link information include no IP address of the CP of the first VNF, the processor 902 correspondingly stores, in the link information, the obtained IP address of the CP of the first VNF and the identification information of the CP of the first VNF in the link information.

Optionally, after the processor 902 obtains the IP address of the CP of the first VNF and the identification information of the CP, and before the processor 902 determines, according to the link information between the VNFs, the identification information of the second VNF corresponding to the identification information of the CP of the first VNF, the operations further include: the processor 902 determines that the link information further includes an IP address of the CP of the first VNF, and determines that the IP address of the CP of the first VNF included in the link information is different from the obtained IP address of the CP of the first VNF.

Further, if the processor 902 determines that the IP address of the CP of the first VNF included in the link information is different from the obtained IP address of the CP of the first VNF, the processor 902 stores the obtained IP address of the CP of the first VNF in the link information by replacing the IP address of the CP of the first VNF included in the link information.

Persons skilled in the art should understand that the embodiments of the present invention may be provided as a method, a system, or a computer program product. Therefore, the present embodiments may use a form of hardware only embodiments, software only embodiments, or embodiments with a combination of software and hardware. Moreover, the present embodiments may use a form of a computer program product that is implemented on one or more computer-usable storage media (including but not limited to a disk memory, a CD-ROM, an optical memory, and the like) that include computer-usable program code.

The present embodiments are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present embodiments.

Obviously, persons skilled in the art can make various modifications and variations to the present embodiments without departing from the scope of the present invention. The present embodiments are intended to cover these modifications and variations provided that they fall within the scope of protection defined by the following claims and their equivalent technologies.

What is claimed is:

1. A method for establishing a link between virtualized network functions, the method comprising:

obtaining, by a network functions virtualization orchestrator (NFVO), a first internet protocol (IP) address of a first connection point (CP) of a first virtualized network function (VNF), and identification information of the first CP;

correspondingly storing, by the NFVO in information on links between VNFs, the first IP address of the first CP of the first VNF and the identification information of the first CP of the first VNF, in response to determining that the information on the links between the VNFs does not comprise the first IP address of the first CP of the first VNF;

after storing the first IP address of the first CP of the first VNF and the identification information of the first CP of the first VNF, determining, by the NFVO according to the information on the links between the VNFs, identification information of a second VNF corresponding to the identification information of the first CP of the first VNF, wherein the VNFs comprise the first VNF and the second VNF, and wherein the information on the links between the VNFs comprises identification information of CPs of the VNFs, a correspondence between identification information of the CPs of the VNFs, and a correspondence between the identification information of the CPs and identification information of the VNFs;

sending, by the NFVO to the second VNF corresponding to the identification information of the second VNF, the first IP address of the first CP of the first VNF and the identification information of the first CP; and starting, by the second VNF according to the first IP address of the first CP of the first VNF, a link connection establishment process between a second CP of the second VNF and the first CP of the first VNF, wherein the CPs comprise the first CP and the second CP.

2. The method according to claim 1, wherein determining the identification information of the second VNF corresponding to the identification information of the first CP of the first VNF comprises:

determining, by the NFVO, according to the information on the links between the VNFs, identification information of a virtual link (VL) corresponding to the identification information of the first CP of the first VNF;

determining identification information of the second CP of the second VNF corresponding to the identification information of the VL; and determining identification information of the second VNF corresponding to the identification information of the second CP of the second VNF.

3. The method according to claim 1, wherein obtaining the first IP address of the first CP of the first VNF and identification information of the first CP comprises:

receiving, by the NFVO, the first IP address of the first CP of the first VNF sent by the first VNF.

4. The method according to claim 3, wherein receiving the first IP address of the first CP of the first VNF comprises:

receiving, by the NFVO, the first IP address of the first CP of the first VNF that is sent by the first VNF, in response to the first VNF determining that the first IP address of the first CP of the first VNF is not already configured.

5. The method according to claim 3, wherein receiving the IP address of the first CP of the first VNF comprises:

receiving, by the NFVO, the first IP address of the first CP of the first VNF that is sent by the first VNF, in response to the first VNF determining that a currently configured IP address of the first CP is different from a previously configured IP address of the first CP.

6. The method according to claim 1, wherein obtaining the first IP address of the first CP of the first VNF and identification information of the first CP comprises:

sending, by the NFVO to the first VNF, a query request message for querying the first IP address of the first CP of the first VNF;

receiving, by the NFVO, a query request response message sent according to the query request message by the first VNF, wherein the query request response message carries the first IP address of the first CP of the first VNF and the identification information of the first CP; and obtaining the first IP address of the first CP of the first VNF and the identification information of the first CP in accordance with the query request response message.

7. The method according to claim 1, further comprising:

determining, by the NFVO, that the information on the links between the VNFs further comprises a second IP address of the first CP of the first VNF, and determining that the second IP address of the first CP of the first VNF is different from the first IP address of the first CP of the first VNF, after the obtaining the first IP address of the first CP of a first VNF and identification information of the first CP, and before determining the identification information of the second VNF corresponding to the identification information of the CP of the first VNF.

8. The method according to claim 7, wherein correspondingly storing, by the NFVO in the information on the links between the VNFs, the first IP address of the first CP of the first VNF and the identification information of the first CP of the first VNF comprises:

storing the first IP address of the first CP of the first VNF in the information on the links between the VNFs by replacing the second IP address of the first CP of the first VNF, in response to the NFVO determining that the second IP address of the first CP of the first VNF is different from the first IP address of the first CP of the first VNF.

9. A network functions virtualization orchestrator (NFVO), comprising:

a transceiver;

one or more processors coupled to the transceiver; and a non-transitory computer-readable memory storing:

information on links between virtual network functions (VNFs); and a program to be executed by the one or more processors, the program including instructions to:

determine that a first internet protocol (IP) address of a first connection point (CP) of a first VNF of the VNFs and identification information of the first CP are obtained;

correspondingly store, in the information on the links between the VNFs, the first IP address of the first CP of the first VNF and the identification information of the first CP of the first VNF, in response to determining that the information on the links between the VNFs does not comprise the first IP address of the first CP of the first VNF, after obtaining the first IP address of the first CP of a first VNF and identification information of the first CP of the first VNF;

after storing the first IP address of the first CP of the first VNF and the identification information of the first CP of the first VNF, determine, according to the information on the links between the VNFs stored by the non-transitory computer-readable memory, identification information of a second VNF of the VNFs corresponding to the identification information of the first CP of the first VNF, wherein the information on the links between the VNFs comprises identification information of CPs of the VNFs, a correspondence between the identification information of the CPs of the VNFs, and a correspondence between the identification information of the CPs and identification information of the VNFs; and send, via the transceiver, the first IP address of the first CP of the first VNF and the identification information of the first CP to the second VNF, instructing the second VNF to start, according to the first IP address of the first CP of the first VNF, a link connection establishment process between a second CP of the second VNF and the first CP of the first VNF.

10. The NFVO according to claim 9, wherein the instructions further include instructions to:
    determine, according to the information on the links between the VNFs stored by the non-transitory computer-readable memory, identification information of a virtual link (VL) corresponding to the identification information of the first CP of the first VNF;
    determine identification information of the second CP of the second VNF corresponding to the identification information of the VL; and
    determine identification information of the second VNF corresponding to the identification information of the second CP of the second VNF.

11. The NFVO according to claim 9, wherein the instructions further comprise instructions to:
    receive, from the first VNF, the first IP address of the first CP of the first VNF.

12. The NFVO according to claim 11, wherein the instructions further comprise instructions to:
    receive the first IP address of the first CP of the first VNF that is sent by the first VNF, in response to the first VNF determining that the first IP address of the first CP of the first VNF is not already configured.

13. The NFVO according to claim 11, wherein the instructions further comprise instructions to:
    receive the first IP address of the first CP of the first VNF that is sent by the first VNF, in response to the first VNF determining that a currently configured IP address of the first CP is different from a previously configured IP address of the first CP.

14. The NFVO according to claim 9, wherein the instructions further comprise instructions to:
    send a query request message for querying the first IP address of the CP of the first VNF to the first VNF; and
    receive a query request response message sent by the first VNF according to the query request message, wherein the query request response message carries the IP address of the first CP of the first VNF and the identification information of the first CP.

15. The NFVO according to claim 9, wherein the instructions further comprise instructions to:
    determine that the information on the links between the VNFs further comprises a second IP address of the first CP of the first VNF, and determine that the second IP address of the first CP of the first VNF is different from the second IP address of the first CP of the first VNF, after the first IP address of the first CP of the first VNF and the identification information of the first CP are obtained, and before the identification information of the second VNF corresponding to the identification information of the first CP of the first VNF is determined.

16. A system for establishing a link between virtualized network functions, comprising:
    one or more processors coupled to one or more non-transitory computer-readable memories storing one or more programs, wherein the one or more programs are executed by the one or more processors to provide:
    a network functions virtualization orchestrator (NFVO);
    a first virtualized network function (VNF); and
    a second VNF;
    wherein the first VNF is configured to send an internet protocol (IP) address of a first connection point (CP) of the first VNF and identification information of the first CP to the NFVO;
    wherein the NFVO is configured to:
        receive the first IP address of the first CP of the first VNF and the identification information of the first CP of the first VNF;
        correspondingly store, in information on links between VNFs, the first IP address of the first CP of the first VNF and the identification information of the first CP of the first VNF, in response to determining that the information on the links between the VNFs does not comprise the first IP address of the first CP of the first VNF, and after receiving the first IP address of the first CP of a first VNF and identification information of the first CP of the first VNF;
        after storing the first IP address of the first CP of the first VNF and the identification information of the first CP of the first VNF, determine, according to the information on the links between the VNFs, identification information of the second VNF corresponding to the identification information of the first CP of the first VNF, wherein the VNFs comprise the first VNF and the second VNF, and wherein the information on the links between the VNFs comprises identification information of CPs of the VNFs, a correspondence between the identification information of the CPs of the VNFs, and a correspondence between the identification information of the CPs and identification information of the VNFs; and
        send the IP address of the first CP of the first VNF and the identification information of the first CP to the second VNF corresponding to the identification information of the second VNF; and
    wherein the second VNF is configured to:
        receive the IP address of the first CP of the first VNF and the identification information of the first CP that are sent by the NFVO; and
        start, according to the IP address of the first CP of the first VNF, a link connection establishment process between a second CP of the second VNF and the first CP of the first VNF.

* * * * *